United States Patent
Zeng et al.

(10) Patent No.: US 11,964,340 B2
(45) Date of Patent: Apr. 23, 2024

(54) DEVICE FOR FABRICATING QUARTZ MICROFLUIDIC CHIP BY FEMTOSECOND PULSE CLUSTER

(71) Applicants: Chongqing Institute of East China Normal University, Chongqing (CN); ROI Optoelectronics Technology CO, LTD., Shanghai (CN); East China Normal University, Shanghai (CN)

(72) Inventors: Heping Zeng, Chongqing (CN); Junyi Nan, Chongqing (CN); Mengyun Hu, Chongqing (CN)

(73) Assignees: CHONGQING INSTITUTE OF EAST CHINA NORMAL UNIVERSITY, Chongqing (CN); ROI OPTOELECTRONICS TECHNOLOGY CO, LTD., Shanghai (CN); EAST CHINA NORMAL UNIVERSITY, Shanghai (CN)

( * ) Notice: Subject to any disclaimer, the term of this patent is extended or adjusted under 35 U.S.C. 154(b) by 157 days.

(21) Appl. No.: 17/528,710

(22) Filed: Nov. 17, 2021

(65) Prior Publication Data

US 2022/0152732 A1  May 19, 2022

(30) Foreign Application Priority Data

Nov. 17, 2020 (CN) .......................... 202011283179.8

(51) Int. Cl.
*B23K 26/0622* (2014.01)
*B23K 26/06* (2014.01)
(Continued)

(52) U.S. Cl.
CPC ...... *B23K 26/0624* (2015.10); *B23K 26/0622* (2015.10); *B23K 26/0648* (2013.01);
(Continued)

(58) Field of Classification Search
CPC ............ B23K 26/0624; B23K 26/0622; B23K 26/0648; B23K 26/0652; B23K 26/067;
(Continued)

(56) References Cited

U.S. PATENT DOCUMENTS 9,904,018 B2 * 2/2018 Herman ................... G02B 6/34
10,017,410 B2 * 7/2018 Hosseini .............. G11B 5/8404
(Continued)

FOREIGN PATENT DOCUMENTS

CN 102513700 B * 4/2015
CN 104934845 A 9/2015
(Continued)

OTHER PUBLICATIONS

Machine English Translation of CN-102513700-B (Year: 2015).*
(Continued)

*Primary Examiner* — Helena Kosanovic
*Assistant Examiner* — Erwin J Wunderlich
(74) *Attorney, Agent, or Firm* — Hodgson Russ LLP (57) ABSTRACT

A device for fabricating a quartz microfluidic chip by a femtosecond pulse cluster. The device includes: a femtosecond pulse cluster laser source configured to output a femtosecond pulse cluster; a beam splitting and interference system, configured to split the femtosecond pulse cluster into a plurality of parts, and to converge split parts to form a femtosecond pulse cluster plasma or a femtosecond pulse cluster plasma grating; a sample system configured to move the electronic displacement platform where a quartz glass is placed to control a position where the parts of the femtosecond pulse cluster are converged on the quartz glass; and a hydrofluoric acid immersion system configured to immerse the quartz glass in a diluent hydrofluoric acid solution to remove an ablated part of the quartz glass to form the quartz microfluidic chip.

11 Claims, 5 Drawing Sheets

(51) Int. Cl.
*B23K 26/067* (2006.01)
*B23K 26/324* (2014.01)
*B23K 26/362* (2014.01)
*B23K 26/40* (2014.01)
*B23K 26/50* (2014.01)
*B23K 26/55* (2014.01)
*B23K 26/57* (2014.01)
*B23K 101/40* (2006.01)
*B23K 103/00* (2006.01)

(52) U.S. Cl.
CPC ........ *B23K 26/0652* (2013.01); *B23K 26/067* (2013.01); *B23K 26/324* (2013.01); *B23K 26/362* (2013.01); *B23K 26/40* (2013.01); *B23K 26/50* (2015.10); *B23K 26/55* (2015.10); *B23K 26/57* (2015.10); *B23K 2101/40* (2018.08); *B23K 2103/54* (2018.08)

(58) Field of Classification Search
CPC .... B23K 26/324; B23K 26/362; B23K 26/40; B23K 26/50; B23K 26/55; B23K 26/57; B23K 2101/40; B23K 2103/54
USPC ...................................... 219/121.61
See application file for complete search history.

(56) References Cited

U.S. PATENT DOCUMENTS

| | | | | |
|---|---|---|---|---|
| 11,203,083 B2* | 12/2021 | Cheng | ............... | B01L 3/502707 |
| 11,370,657 B2* | 6/2022 | Zeng | ...................... | B23K 26/53 |
| 11,695,247 B2* | 7/2023 | Zhou | ...................... | H01S 3/005 |
| | | | | 359/341.1 |
| 2006/0065640 A1 | 3/2006 | Lizotte et al. | | |
| 2012/0111841 A1* | 5/2012 | Murison | ............... | B23K 26/382 |
| | | | | 219/121.71 |
| 2015/0118522 A1* | 4/2015 | Hosseini | ............. | C03B 33/0222 |
| | | | | 428/64.2 |
| 2016/0067822 A1* | 3/2016 | Arai | ..................... | B23K 26/083 |
| | | | | 65/102 |
| 2016/0344156 A1* | 11/2016 | Rothberg | ............... | H01S 3/1305 |
| 2022/0001495 A1* | 1/2022 | Knox | .......................... | A61F 2/16 |
| 2023/0038030 A1* | 2/2023 | Knox | ................... | B23K 26/082 |

FOREIGN PATENT DOCUMENTS

| | | | | | |
|---|---|---|---|---|---|
| CN | 104591549 B | * | 8/2017 | ............. | C03C 15/00 |
| CN | 109346911 A | | 2/2019 | | |
| CN | 110265855 A | | 9/2019 | | |
| CN | 111408856 A | | 7/2020 | | |

OTHER PUBLICATIONS

Machine English Translation of CN-104591549-B (Year: 2017).*
CNIPA, Office Action for CN Application No. 202011283179.8, dated May 9, 2022.
Hu et al., Plasma-grating-induced Breakdown Spectroscopy, Advanced Photonics, vol. 2(6), p. 065001, 5 pages, Oct. 2020.

* cited by examiner

DEVICE FOR FABRICATING QUARTZ MICROFLUIDIC CHIP BY FEMTOSECOND PULSE CLUSTER

CROSS-REFERENCE TO RELATED APPLICATION

This application claims priority to, and the benefits of, Chinese Patent Application Serial No. 202011283179.8, filed on Nov. 17, 2020, the entire content of which is incorporated herein by reference.

FIELD

The present disclosure relates to a technical field of microfluidic chip fabrication, and specifically relates to a device for fabricating a quartz microfluidic chip by a femtosecond pulse cluster.

BACKGROUND

A microfluidic chip is a device used in studies in which micro-channels or micro-cavities have been molded or patterned, which may be widely used in fields of medicine, biology, chemistry, and materials. For the existing methods for processing the micro-channels in the microfluidic chip, such as hot pressing, ultraviolet exposure and acid etching, injection molding, and laser ablation, a complex structure of the micro-channels or micro-cavities in a three-dimensional space is difficult to be formed inside a quartz glass on a large scale.

SUMMARY

The present disclosure provides in embodiments a device for fabricating a quartz microfluidic chip by a femtosecond pulse cluster. The device includes: a femtosecond pulse cluster laser source, configured to output a femtosecond pulse cluster; a beam splitting and interference system, including a beam splitting device, a time domain adjustment controller and a convergent lens, and configured to split the femtosecond pulse cluster into a plurality of parts by the beam splitting device, and to converge split parts by the convergent lens to form a femtosecond pulse cluster plasma or a femtosecond pulse cluster plasma grating; a sample system including an imaging device, a quartz glass, and a three-dimensional electronic displacement platform, and configured to move the electronic displacement platform where the quartz glass is placed to control a position where the parts of the femtosecond pulse cluster are converged on the quartz glass to ablate the quartz glass to form a micro-channel structure inside the quartz glass and/or on a surface of the quartz glass; and a hydrofluoric acid immersion system, configured to immerse the quartz glass in a diluent hydrofluoric acid solution to remove an ablated part of the quartz glass to form the quartz microfluidic chip.

In some embodiments, the femtosecond pulse cluster laser source includes: a femtosecond laser seed source, configured to output a periodic pulse with a repetition frequency f and a time interval $\tau$; an optical amplitude modulation device, including an optical shutter with a period of $f_R$ smaller than f; and configured to perform modulations of frequency lowering and pulse number selecting to obtain the femtosecond pulse cluster having a repetition frequency $f_R$ and a time interval $\tau$ less than 1 µs; and an amplifier configured to amplify the femtosecond pulse cluster.

In some embodiments, the femtosecond pulse cluster laser source includes: an optical fiber seed source with a cavity length $L_s$, configured to output a pulse train having a repetition frequency f; a first electro-optic modulator, configured to perform modulations of frequency lowering and pulse number selecting to obtain a first pulse cluster having a repetition frequency $f_R$ and a time domain interval $\tau_s=1/f$; an optical fiber regeneration and amplification resonant cavity with a cavity length of $L_a$, configured to regenerate and amplify the first pulse cluster; a second electro-optic modulator, configured to shape the regenerated and amplified first pulse cluster to obtain a second pulse cluster having a repetition frequency $f_R$ and a time interval $\tau$ represented by $|L_s-L_a|/n\cdot c$, where n represents an average refractive index of a fiber core, and c represents a light speed in vacuum; an optical fiber amplifier, configured to amplify the second pulse cluster; a pulse width compression module, configured to perform a pulse compression to the amplified second pulse cluster to obtain the femtosecond pulse cluster having a repetition frequency $f_R$ and a time interval $\tau$ represented by $|L_s-L_a|/n\cdot c$.

In some embodiments, the femtosecond pulse cluster laser source includes: a femtosecond laser seed source, configured to output a femtosecond seed pulse having a repetition frequency $f_R$ in a range of 1 KHz to 100 MHz; a splitting device, configured to split the femtosecond seed pulse into N pulses, where N represents an integer multiple of 2; an optical fiber amplification system for each split pulse, configured to amplify the split pulse, wherein an fiber length for each optical fiber amplification system is increased gradually; and a pulse combiner, configured to combine the amplified pulses into the femtosecond pulse cluster having a repetition frequency $f_R$ and a time interval $\tau$, wherein the time interval $\tau$ is determined by dividing a length difference between two optical fiber amplification systems by the light speed.

In some embodiments, the femtosecond pulse cluster laser source is configure to output a laser pulse with a repetition frequency $f_R$, and the device further includes a multi-pulse generating module, arranged in an optical path outside the femtosecond pulse laser, and configured to split the laser pulse into a plurality of equal pulses, to provide an optical path having a different length for each split pulse, and to combine the pulses into the femtosecond pulse cluster having a repetition frequency $f_R$ and a time interval $\tau$.

In some embodiments, the beam splitting device is one or more beam splitters, a combination of a half-wave filter and a polarization beam splitting prism, a microarray reflector, or a diffractive beam splitting element.

In some embodiments, the time domain adjustment controller includes a linear electronic displacement platform and a reflector.

In some embodiments, the imaging device includes a telescope system including a first convex lens, a second convex lens, and a CCD camera, wherein the first convex lens is placed in a cross section of the optical axis, and has a focal point coinciding with a focal point of the convergent lens, and the CCD camera is placed at a focal point of the second convex lens.

In some embodiments, the hydrofluoric acid immersion system includes an ultrasonic cleaner containing the diluent hydrofluoric acid solution.

In some embodiments, the femtosecond pulse cluster laser source includes an optical fiber laser or a solid-state laser, and the femtosecond pulse cluster output by the femtosecond pulse cluster laser source is a femtosecond pulse or a picosecond pulse.

In some embodiments, the femtosecond laser seed source is an optical fiber laser, a solid-state laser or a semiconductor disc laser, and has the repetition frequency f greater than 1 MHz.

In some embodiments, the repetition frequency $f_R$ is in a range of 100 Hz to 1 MHz.

In some embodiments, the optical fiber seed source is a mode-locked fiber laser with a cavity length of $L_s$, including a semiconductor laser pump, an optical fiber coupler, a gain fiber, an isolator, a polarization controller and a repetition frequency locking module.

In some embodiments, the repetition frequency locking module includes a fiber circulator, a collimator, an end reflector, a phase-locked loop, a signal generator and a linear electronic displacement platform, and is configured to adjust the cavity length of the resonant cavity and lock the repetition frequency.

In some embodiments, the fiber regeneration and amplification resonant cavity is a mode-locked fiber laser with a cavity length of $L_a$, and includes a semiconductor laser pump, an optical fiber coupler, a gain fiber, an isolator, a polarization controller and a cavity length adjustment module, wherein the cavity length adjustment module include an optical fiber circulator, a collimator, an end reflector and a linear electronic displacement platform.

In some embodiments, the second electro-optic modulator is triggered by a falling edge of a gate voltage of the first electro-optic modulator.

In some embodiments, the optical fiber amplifier includes a semiconductor laser pump, an optical fiber coupler, a gain fiber, an isolator, and an optical fiber collimator and a pulse compression module, wherein the pulse compression module includes a pair of transmission gratings and an end reflector.

In some embodiments, the multi-pulse generating module includes a half-wave filter, a polarization splitting prism, and a right-angle triangular prism.

In some embodiments, the multi-pulse generating module includes a half-wave filter, a polarization splitting prism, an end reflector and a linear electronic displacement platform.

In some embodiments, the multi-pulse generating module includes a half-wave filter and a birefringent crystal.

DETAILED DESCRIPTION

Embodiments of the present disclosure are described in detail below, examples of which are illustrated in the drawings. The same or similar elements are denoted by same reference numerals in different drawings unless indicated otherwise. The embodiments described herein with reference to drawings are explanatory, and used to generally understand the present disclosure. The embodiments shall not be construed to limit the present disclosure.

The present disclosure provides a device for fabricating a quartz microfluidic chip by a femtosecond pulse cluster, which is capable of forming a plasma or spatial interference plasma grating on a surface or inside a quartz glass. The femtosecond pulse cluster is a sequence of a plurality of light pulses with a relatively small time domain interval (less than 1 μs) in a single periodic laser pulse envelope. During operation, this laser pulse mode can increase an ablation rate for a material to be processed, increase an ablation depth and improve a surface flatness for a laser ablation area of the material. By combining the femtosecond pulse cluster processing technology and plasma ablation technology, a fabricating speed of the quartz glass microfluidic chip can be increased, roughness of wall surfaces of the microfluidic structure can be reduced, and thus the present method and device are suitable to process the microfluidic chip with a three-dimensional structure.

In some embodiments, the present disclosure provides a method for generating a femtosecond pulse cluster. The method for generating a femtosecond pulse cluster is one selected from (A) an amplitude modulation method for a laser pulse sequence, (B) an all-fiber pulse cluster laser resonant cavity method, (C) an all-fiber laser cavity output pulse splitting and amplification method, and (D) a laser cavity-exterior splitting and combination method.

In some embodiments, the device for fabricating a quartz microfluidic chip by a femtosecond pulse cluster includes a femtosecond pulse cluster laser source, a beam splitting and interference system, a sample system (where a sample is processed by laser ablation to have a microfluidic structure), and a hydrofluoric acid immersion system.

The femtosecond pulse cluster laser source is configured to output a femtosecond pulse cluster according to an amplitude modulation method for a laser pulse sequence, an all-fiber pulse cluster laser resonant cavity method, an all-fiber laser cavity output pulse splitting and amplification method, or a laser cavity-exterior splitting and combination method. The beam splitting and interference system is configured to split the femtosecond pulse cluster into multiple parts by beam splitter(s), and to make split femtosecond pulse clusters pass through a convergent lens to form a femtosecond pulse cluster plasma or a femtosecond pulse cluster plasma grating at a focal point of the convergent lens. The femtosecond pulse cluster plasma grating is formed by multi-pulse interference. The sample system is configured to precisely move an electronic displacement platform where a quartz glass is placed to control a position the femtosecond pulse cluster plasma acts on the quartz glass, and thus the quartz glass is ablated to form a microfluidic structure inside the quartz glass and/or on a surface of the quartz glass. The hydrofluoric acid immersion system 400 is configured to immerse the quartz glass in a diluent hydrofluoric acid solution to remove an ablated part of the quartz glass to form the quartz microfluidic chip.

In some embodiments, the femtosecond pulse cluster is generated by (A) the amplitude modulation method for the laser pulse sequence, and the amplitude modulation method is described below.

A femtosecond pulse cluster laser outputs periodic laser pulse trains, in which a single periodic envelope includes multiple sub-laser pulse trains with an equal time domain interval ($\tau$<1 $\mu$s) and an equal power. A femtosecond laser seed source outputs a periodic pulse with a repetition frequency of f (f=1/$\tau$). The periodic pulse is subjected to repetition frequency lowering and pulse number selecting by an optical amplitude modulation device such as an acousto-optical modulator or an electro-optic modulator. An optical shutter has a period of $f_R$ which is smaller than f. After the periodic pulse passes through the optical amplitude modulation device, a femtosecond pulse cluster having a repetition frequency $f_R$ is acquired, and the pulse envelope includes a plurality of sub-pulses with an interval $\tau$ in the time domain. The femtosecond pulse cluster is optically amplified to obtain a high single pulse energy, which is used to fabricate a quartz glass microfluidic chip.

In some embodiments, the femtosecond pulse cluster is generated by (B) the all-fiber pulse cluster laser resonant cavity method, and the all-fiber pulse cluster laser resonant cavity method is described below.

An optical fiber seed source with a cavity length of $L_s$ outputs a pulse train having a repetition frequency of f. A first electro-optic modulator performs modulations of frequency lowering and pulse number selecting to the pulse to obtain a first pulse cluster having a repetition frequency $f_R$ and a time domain interval $\tau_s$=1/f. The first pulse cluster is coupled into an optical fiber regeneration and amplification resonant cavity with a cavity length of $L_a$. After the regeneration and amplification, the first pulse cluster is coupled into a second electro-optic modulator for pulse shaping to obtain a second pulse cluster having a repetition frequency $f_R$ and an interval in the time domain, $\tau=L_s-L_a/n\cdot c$, where n represents an average refractive index of a fiber core, and c represents a light speed in vacuum. The second pulse cluster passes through an optical fiber amplifier and a pulse width compression module to obtain the femtosecond pulse cluster having a high single pulse energy, which is used for fabricating the quartz glass microfluidic chip.

In some embodiments, the femtosecond pulse cluster is generated by (C) the all-fiber laser cavity output pulse splitting and amplification method, and the all-fiber laser cavity output pulse splitting and amplification method is described below.

A femtosecond seed pulse having a repetition frequency $f_R$ (in level of KHz or MHz) is split into N pulses, where N represents an integer multiple of 2. Each split pulse is subjected to a time domain delay and a power amplification. A pulse combiner is configured to combine the amplified pulses into one, and is output by an optical fiber collimator to obtain the femtosecond pulse cluster having a repetition frequency $f_R$ and a time domain interval $\tau$. The femtosecond pulse cluster has a high single pulse energy, which is used for fabricating the quartz glass microfluidic chip.

In some embodiments, the femtosecond pulse cluster is generated by (D) the laser cavity-exterior splitting and combination method, and the laser cavity-exterior splitting and combination method is described below.

A laser pulse output by a laser with a repetition frequency $f_R$ and a high single pulse energy is divided into a plurality of equal pulses by beam splitter(s) arranged in an optical path outside the laser. A time domain interval $\tau$ between the split pulses is formed by difference in the optical path of the pulses. The pulses are combined into the femtosecond pulse cluster having a repetition frequency $f_R$ and a time domain interval $\tau$, which is used for fabricating the quartz glass microfluidic chip.

In some embodiments, the beam splitting and interference system includes: a beam splitting device, a time domain adjustment controller and a convergent lens. The beam splitting device may be one or more beam splitters, a combination of a half-wave filter and a polarization beam splitting prism, a microarray reflector, or a diffractive beam splitting element. The time domain adjustment controller may include a linear electronic displacement platform and a reflector. The convergent lens may be a circular lens, which is configured to converge the femtosecond pulse cluster to form a cylindrical plasma grating in the quartz glass. The convergent lens may be a plano-convex cylindrical lens, which is configured to converge the femtosecond pulse cluster to form a planar plasma grating in the quartz glass, parallel to an optical axis. The convergent lens may be a microlens array, which is configured to use the femtosecond pulse lasers to cause interference to form a three-dimensional plasma grating in the quartz glass. The convergent lens may be a conical lens. The convergent lens can be selected according to requirements for fabricating the microfluidic chip with a microfluidic structure.

In some embodiments, the sample system includes an imaging device, a quartz glass, and a three-dimensional electronic displacement platform. The imaging device may include a telescope system composed of a first convex lens, a second convex lens and a CCD camera. The first convex lens is placed in a cross section of the optical axis, and has a focal point coinciding with a focal point of the convergent lens. The CCD camera is placed at a focal point of the second convex lens, and is connected to a computer through a data line. Shape of the plasma grating and the process can be observed on the computer in real time. The quartz glass is a sample to be processed, which is fixed on the three-dimensional electronic displacement platform. According to the microfluidic structure design, a length of an optical filament and the number of optical filaments of the femtosecond pulse cluster plasma grating, and the pulse interval $\tau$ of the pulse cluster can be adjusted. By coordinately controlling the three-dimensional electronic displacement platform, the quartz glass is ablated to form a structure of micro-channels inside the quartz glass. Path(s) or hole(s) from a surface of the quartz glass to the micro-channels is formed to allow the dilute hydrofluoric acid solution to flow into the inside of the quartz glass.

The hydrofluoric acid immersion system includes an ultrasonic cleaner containing a diluent hydrofluoric acid solution. The quartz glass is immersed in the diluent hydrofluoric acid solution for a preset period, and a laser-ablated area of the quartz glass is corroded and removed to obtain the chip with the structure of micro-channels. The micro-channels of the present disclosure refer to three-dimensional micro-channels on the surface of or inside the quartz glass, which are formed by the femtosecond pulse cluster plasma. The femtosecond pulse cluster plasma is used to ablate the surface or inside of the quartz glass to change a refractive index, a chemical property, and a lattice structure of plasma-ablated area of the quartz glass, which has a high corrosion rate when the quartz glass is immersed in hydrofluoric acid.

In some embodiments, the final output laser pulse of the femtosecond pulse cluster laser source is a femtosecond pulse or a picosecond pulse. The laser light source may be an optical fiber laser or a solid-state laser.

In some embodiments, the femtosecond pulse cluster laser in the method (A) has a repetition frequency of f>1 MHz before the amplitude modulation. The femtosecond pulse cluster laser may be an optical fiber laser, a solid-state laser or a semiconductor disc laser. The output laser single pulse energy can be adjusted. The repetition frequency $f_R$ may be adjusted between 100 Hz and 1 MHz. The time interval $\tau$ between any adjacent pulses in the pulse cluster envelope is smaller than 1 µs. The number of the pulses in the pulse cluster envelope is adjustable, and may be one or more. For the optical fiber laser and the solid-state laser, the time interval is generally in a nanosecond or a sub-nanosecond level, that is, the pulse interval is relatively large. When the repetition frequency of the semiconductor disc laser is between 5 GHz and 100 GHz, the time interval $\tau$ between any two adjacent pulses in the pulse cluster envelope is in a picosecond level. This high repetition frequency seed laser output by the semiconductor laser is subjected to the modulations of frequency lowering and pulse number selecting, and is finally amplified for laser processing. With this method, the device is highly integrated and the device is simple and convenient.

In some embodiments, the optical fiber seed source used in the method (B) is a mode-locked fiber laser with a cavity length of $L_s$, including a semiconductor laser pump, an optical fiber coupler, a gain fiber, an isolator, a polarization controller and a repetition frequency locking module. The repetition frequency locking module includes a fiber circulator, a collimator, an end reflector, a phase-locked loop, a signal generator and a linear electronic displacement platform, and is configured to adjust the cavity length of the resonant cavity and lock the repetition frequency.

In some embodiments, the fiber regeneration and amplification resonant cavity used in the method (B) is a mode-locked fiber laser with a cavity length of $L_a$, and includes a semiconductor laser pump, an optical fiber coupler, a gain fiber, an isolator, a polarization controller and a cavity length adjustment module. The cavity length adjustment module includes an optical fiber circulator, a collimator, an end reflector and a linear electronic displacement platform.

In some embodiments, the second electro-optic modulator used in the method (B) is triggered by a falling edge of a gate voltage of the first electro-optic modulator for filtering the laser pulse cluster after the regeneration and amplification cavity.

In some embodiments, the optical fiber amplifier used in the method (B) includes a semiconductor laser pump, an optical fiber coupler, a gain fiber, an isolator, and an optical fiber collimator and a pulse compression module. The pulse compression module includes a pair of transmission gratings and an end reflector.

In some embodiments, a device for performing the all-fiber laser cavity output pulse splitting and amplification method (C) includes: an optical fiber seed source, a fiber splitter, a semiconductor laser pump, a single-mode optical fiber, a gain fiber, a ring coupler, an isolator, a dispersion compensation fiber, and an optical fiber combiner. The single-mode optical fiber for each splitting and amplification optical path has different length from each other, and thus the time domain interval of the combined pulse cluster can be controlled by adjusting the lengths of the optical paths.

The fiber seed source may have an all-fiber or half-fiber and half-space mode-locked pulse laser resonant cavity. Each pulse split from the seed pulse is subjected to power amplification. Before the combination, each pulse passes an optical path with different length, which can be controlled and adjusted. An interval between any two pulses is calculated by dividing the length difference between the two optical paths by the light speed. With the splitting, amplifying, and combining operations, competition between pulses in the gain process can be reduced, an optical power of each pulse can be relatively adjustable, thus increasing an ablation efficiency of the laser ablation process.

In some embodiments, a device for performing the method (D) includes a femtosecond pulse laser and a multi-pulse generating module. The femtosecond pulse laser may be a solid-state laser, a semiconductor laser, or a gas laser. The multi-pulse generating module includes a half-wave filter, a polarization splitting prism, a right-angle triangular prism or an end reflector and a linear electronic displacement platform, or include a half-wave filter and a birefringent crystal. In an example of the half-wave filter and the birefringent crystal, when a pulse is incident into the birefringent crystal at a certain polarization angle, lengths of ordinary wave and extraordinary wave propagating paths in the crystal are different, causing the pulses to be separate in the time domain. By changing a length of the birefringent crystal and refractive index difference between the ordinary wave and the extraordinary wave, a time-domain walk-off between the pulses can be controlled. When multiple birefringent crystals are used, the single pulse may be split in 2, 4, etc. pulses in the time domain. Similarly, two polarization beam splitting prisms attached to each other and a right-angle triangular prism can also realize the polarization, splitting and combination for the incident pulse in the time domain. A time-domain interval $\tau$ between the pulses of the combined femtosecond pulse cluster in the time domain is smaller than 1 µs, which is controlled by a time domain delay controller. The module composed of the half-wave filter, the polarization beam splitting prism and the right-angle triangular prism provides a preset delay between the pulses, and is highly integrated. By using the combination of the half-wave filter, the polarization splitting prism, the end reflector and the linear electronic displacement platform, the time-domain interval $\tau$ can be adjusted by the linear electronic displacement platform.

In some embodiments, during the ablation process with the femtosecond pulse cluster, one laser beam is used to form plasma on the surface or inside of the quartz glass, or two laser beams are used to cause the interference to form the plasma grating on the surface or inside of the quartz glass, or three laser beams are used and interacted to coordinately ablate the quartz glass. During the formation of the femtosecond pulse cluster plasma grating, two or more femtosecond pulse cluster laser beams generate plasma in the quartz glass and cause interference. The interference happened to two or more pulse clusters each having multiple pulses refers to for example interference between a first pulse of a first pulse cluster and a first pulse of a second pulse cluster, a second pulse of the first pulse cluster and a second pulse of the second pulse cluster, and so on. In this way, the femtosecond pulse cluster plasma grating is formed on the surface or inside of the quartz.

In some embodiments, the micro-channel is a three-dimensional micro-channel on the surface of or inside the quartz glass, which are formed by the femtosecond pulse cluster plasma. The femtosecond pulse cluster plasma is used to ablate the surface or inside of the quartz glass to change a refractive index, a chemical property, and a lattice structure of plasma-ablated area of the quartz glass.

The present discloses a method for fabricating a microfluidic chip by a femtosecond pulse cluster plasma grating. The method combines the femtosecond pulse cluster processing technology with the plasma grating technology.

In the present disclosure, the plasma grating is used to process the micro-channels in the quartz glass. Since the plasma grating has multiple optical filaments arranged at equal intervals in space, each optical filament may be used to ablate the quartz to form a micro-channel. The multiple optical filaments can be used for ablation at the same time, thus increasing a processing speed. The length of the optical filament and the number of the optical filaments in the plasma grating can be adjusted by the laser energy, a focal length of the convergent lens, a chirp of the pulse, and an angle of the plasma interference. Therefore, a depth of processing the quartz glass can be flexibly changed to realize the formation of the micro-channels in a three-dimensional scale.

When the time-domain interval between the pulses in the femtosecond pulse cluster is in a nanosecond level or higher, the heat accumulation effect is the main factor to affect the ablation efficiency. A first pulse of the multi-pulse cluster reaches on the quartz glass, and generates a high-temperature plasma, which will cause the local temperature of the quartz glass to rise. After a time interval of nanosecond(s), before the local temperature drops, a second pulse of the cluster reaches on the same position of the quartz glass. For the second pulse, an initial temperature of the quartz glass is higher than that for the first pulse. In a short period, the pulses in the pulse cluster that gradually reach on the same position of the quartz glass will result in a local thermal accumulation effect, which advantageously improves the ablation efficiency, and increases the ablation depth and ablation diameter. In this case, the advantages of plasma grating ablation technology can be further combined with the advantages of the pulse cluster ablation.

The heat accumulation caused by first few pulses can reduce an ionization threshold of the later pulses for the quartz glass, and increase an energy absorption efficiency of the quartz glass. When the later pulse is ionized, a plasma grating with a higher plasma density may be formed, and thus the ablation efficiency of plasma grating can be improved. Further, the first few pulses can ablate the quartz glass to make the ablated area have a high refractive index, that is, to form an optical waveguide. When the later pulses come, they are coupled into the optical waveguide, to reduce the loss of laser transmission in the plasma channel and increase the length of the optical filament.

When the time domain interval between the pulses in the femtosecond pulse cluster is within a range of tens to hundreds of picoseconds, the main factor of the ablation efficiency is increases of plasma density and plasma temperature caused by the interaction between the pulses. When the first pulse is applied to the glass, a large amount of plasma is generated due to the nonlinear effect, and the quartz glass is ablated by plasma heating and shocking. After tens of picoseconds, the second pulse reaches the plasma channel generated by the first pulse, a cross-section of the plasma channel is extended, which is close to a diameter of incident pulse beam. Moreover, since the time interval between the first pulse and the second pulse is short, the temperature and electron density of the plasma generated by the first pulse are still relatively high. Therefore, when the second pulse enters the plasma channel, the plasma will absorb most of the energy of the pulse. An electric field will accelerate electrons in the plasma to obtain greater kinetic energy, causing collision ionization. In this way, the temperature and electron density of the plasma are higher than those of a plasma generated by a single laser beam having the same energy with the pulse of the present disclosure. The higher plasma temperature and density are is beneficial to the ablation process for the quartz glass, which increases the processing speed.

During the interaction of the pulses of a femtosecond pulse cluster, plasma enhancement occurs when the time interval between any two adjacent pulses is between 10 to 100 picoseconds. If the time interval is less than ten picoseconds, the plasma is not sufficiently diffused, and an area of the cross section for absorbing a later incident pulse is small. If the time interval is greater than one hundred picoseconds, the temperature and density of the plasma are attenuated largely. Even if the energy of the laser pulse is absorbed, it is still not enough to enhance the temperature and density of the plasma. Therefore, the plasma enhancement effect is sensitive to the time domain interval of the pulses. On this basis, the time domain interval can be controlled to adjust the processing speed and the ablation effect during the ultra-fast laser processing for the micro-channels of the quartz glass. In addition, the plasma density enhancement effect is also related to the energy density of the laser pulse. The coordinated adjustment of the power density of the laser pulse and the time interval of the pulses is beneficial to maximize the plasma enhancement effect.

When the time domain interval between any two adjacent pulses in the femtosecond pulse cluster is approximately 10 picoseconds, a structure of a part of the quartz where a first pulse is applied may be changed due to the high temperature plasma generated by the first pulse. A Si—O bond is break and recombined to cause a refractive index change in this part of the quartz glass. Compared to the remaining part where the pulse is not applied, a quartz waveguide of a small size is formed. At this time, the cross-section of the plasma is relatively small with respect to the diameter of the pulse, and the energy absorption capacity for the second pulse is weak. After approximately 10 picoseconds, the second pulse enters the quartz waveguide generated by the first pulse, so that the pulse is restrained in a small space, thereby enhancing the energy density of the second pulse, and improving depth and efficiency of laser ablation.

When the time domain interval between any two adjacent pulses in the femtosecond pulse cluster is approximately 1 picosecond, but the adjacent pulses are not superimposed in the time domain, it is beneficial to enhance the depth and efficiency of the laser ablation. Specifically, when the first pulse is applied on the quartz glass, plasma is generated. Due to the short interval, the plasma generated by the first pulse has not been diffused, and the cross-section of the ablated area is very small. In this case, the plasma channel may be regarded as a waveguide with a very small diameter (in a submicron level, i.e., from 100 nm to 1 μm). It can not only absorb the energy of the subsequent pulse, but also confine part of the energy of the subsequent pulse in the plasma channel, thereby locally enhancing the energy density of the subsequent pulse, and increasing the ablation depth. This process may assist in processing high-precision micro-channels in the quartz glass even under a low incident laser energy density condition.

For the all-fiber pulse cluster laser resonant cavity method, the femtosecond pulse cluster laser source adopts the all-fiber design, the pulse cluster from the seed source passes through the regeneration and amplification system to obtain the femtosecond pulse cluster with an adjustable time interval in a range of picoseconds to nanoseconds.

During applying the sub-pulses in the femtosecond pulse cluster on the quartz sample, before a plasma shock wave generated in the sample by a first pulse disappears, it will be superimposed with a shock wave generated by a second pulse, increasing the lattice resonance of the ablated part of the sample, thereby increasing the efficiency of laser ablation. Before the shock wave generated by the first pulse spreads into the air, the plasma generated by the second pulse will be partially reflected and applied on the sample material to form a reverse impact instantaneous pressure. This reverse impact pressure can increase the temperature and electron density of the plasma, thus increasing the ablation efficiency and reducing roughness of ablated surface.

The present disclosure is further described with the following drawings.

Figure 1:
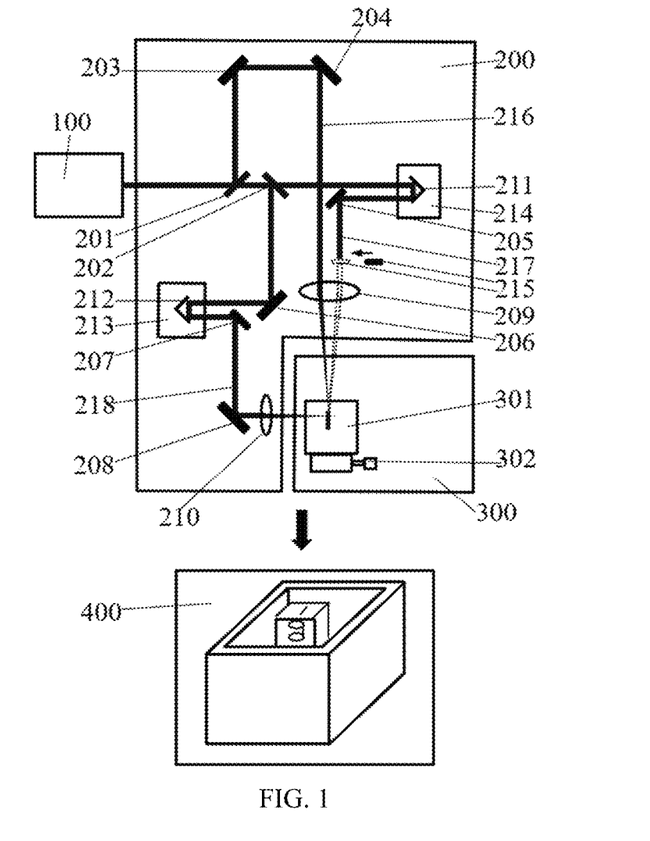
FIG. 1 is a schematic diagram of a device for fabricating a quartz microfluidic chip by a femtosecond pulse cluster according to an embodiment of the present disclosure.

As shown in FIG. 1, the device for fabricating a quartz microfluidic chip by a femtosecond pulse cluster includes a femtosecond pulse cluster laser source 100, a beam splitting and interference system 200, a sample system 300 (where a sample is processed by laser ablation to have a structure of micro-channels or micro-cavities), and a hydrofluoric acid immersion system 400.

The femtosecond pulse cluster laser source 100 is configured to output a femtosecond pulse cluster according to an amplitude modulation method for a laser pulse sequence, an all-fiber pulse cluster laser resonant cavity method, an all-fiber laser cavity output pulse splitting and amplification method, or a laser cavity-exterior splitting and combination method. The femtosecond pulse cluster reaches a first beam splitter 201 in the beam splitting and interference system 200.

After passing through the first beam splitter 201 and a second beam splitter 202, the femtosecond pulse cluster is split into three femtosecond pulse clusters having the same power, i.e., a first reflection pulse cluster 216, a transmission pulse cluster 217 and a second reflection pulse cluster 218. After the first reflection pulse cluster 216 passes through a first reflector 203 and a second reflector 204, which are used to change an optical path of the first reflection pulse 216, it passes through a first circular convergent lens 209 and then is focused on a first quartz glass 301 of the sample system 300. The transmission pulse cluster 217 passes through a first delay controller composed of a first recurve reflector 211 and a first linear displacement platform 214, which is used to change an optical path of the transmission pulse cluster 217, and is reflected by a third reflector 205 and is converged on the first quartz glass 301 by the first circular convergent lens 209. The transmission pulse cluster 217 and the first reflection pulse cluster 216 have the same focal point and are synchronous with each other in the time domain, and thus the interference occurs on the first quartz glass 301. A light baffle 215 may be arranged to block out the transmission pulse cluster 217, when it is placed between the third reflector 205 and the first circular convergent lens 209 on the optical path. At this time, the device only uses the first reflection pulse cluster 216 performs the laser ablation. When the light baffle 215 is not arranged on the optical path, the device uses a plasma grating formed by the interference of two pulse clusters (i.e., two noncollinear femtosecond filaments) for optical ablation. The second reflection pulse cluster 218 is reflected by a fourth reflector 206 to a second delay controller composed of a second recurve reflector 212 and a second linear electronic displacement platform 213, followed by a fifth reflector 207 and a sixth reflector 208 which are used to change an optical path of the second reflection pulse cluster 218, and is finally focused on the first quartz glass 301 through a second circular convergent lens 210. The second reflection pulse cluster 218 has a coincident focal point with the other two clusters 216 and 217, and is synchronized with them in the time domain. Multiple femtosecond pulse clusters are applied together on the first quartz glass 301. By adjusting the power and pulse width of the pulse clusters, a shape of the plasma or plasma grating formed on the first quartz glass 301 can be changed.

According to a processing model for the glass, a processing flow for the structure of the micro-channels is designed, and a first high-precision three-dimensional electronic control platform 302, where the glass 301 is placed, is moved to change the position of the femtosecond pulse cluster applying on the first quartz glass 301 until the micro-channel processing is completed by the laser ablation. After the first quartz glass 301 is laser ablated, it is put into the hydrofluoric acid immersion system 400 including an ultrasonic cleaner containing a diluent hydrofluoric acid solution. A laser-ablated part of the first quartz glass 301 will be corroded by hydrofluoric acid faster than the rest parts. That is, after the first quartz glass 301 is immersed in the system 400 for a preset period, the micro-channels are formed on the first quartz glass 301.

Figure 2:
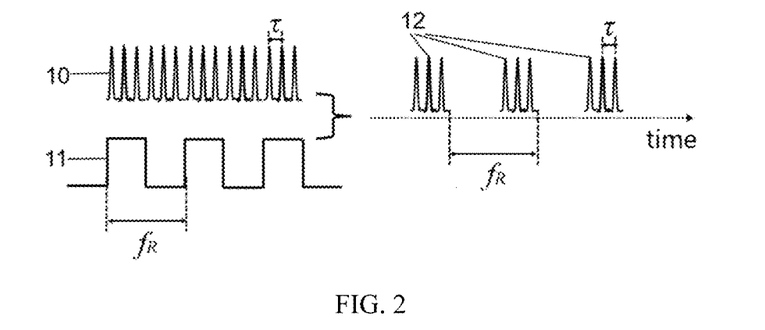
FIG. 2 is a schematic diagram showing formation of a femtosecond pulse cluster by an amplitude modulation according to an embodiment of the present disclosure.

FIG. 2 shows formation of the femtosecond pulse cluster by the amplitude modulation for the laser pulse sequence. A femtosecond laser seed source outputs a periodic pulse 10 with a repetition frequency of f ($f=1/\tau$). The periodic pulse 10 is subjected to repetition frequency lowering and pulse number selecting by an optical amplitude modulation device such as an acousto-optical modulator or an electro-optic modulator. A signal 11 for the amplitude modulation has a repetition frequency $f_R$ smaller than f. After the periodic pulse 10 passes through the optical amplitude modulation device, a femtosecond pulse cluster 12 having a repetition frequency $f_R$ is acquired, and an interval in the time domain between two adjacent sub-pulses of a pulse envelope is $\tau$. The femtosecond pulse cluster 12 is optically amplified to obtain a high single pulse energy, which is used to fabricate a quartz glass microfluidic chip.

Figure 3:
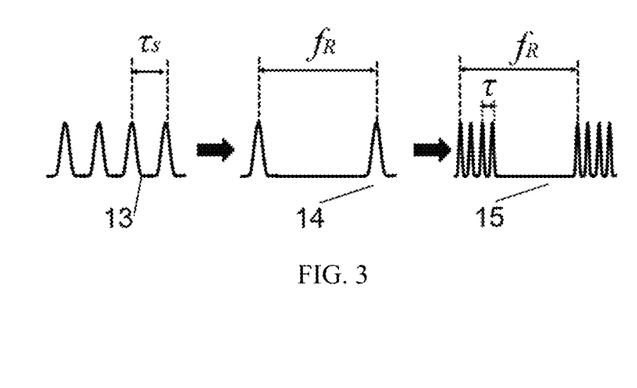
FIG. 3 is a schematic diagram showing formation of a femtosecond pulse cluster by an all-fiber pulse cluster laser resonant cavity method according to an embodiment of the present disclosure.
Figure 4:
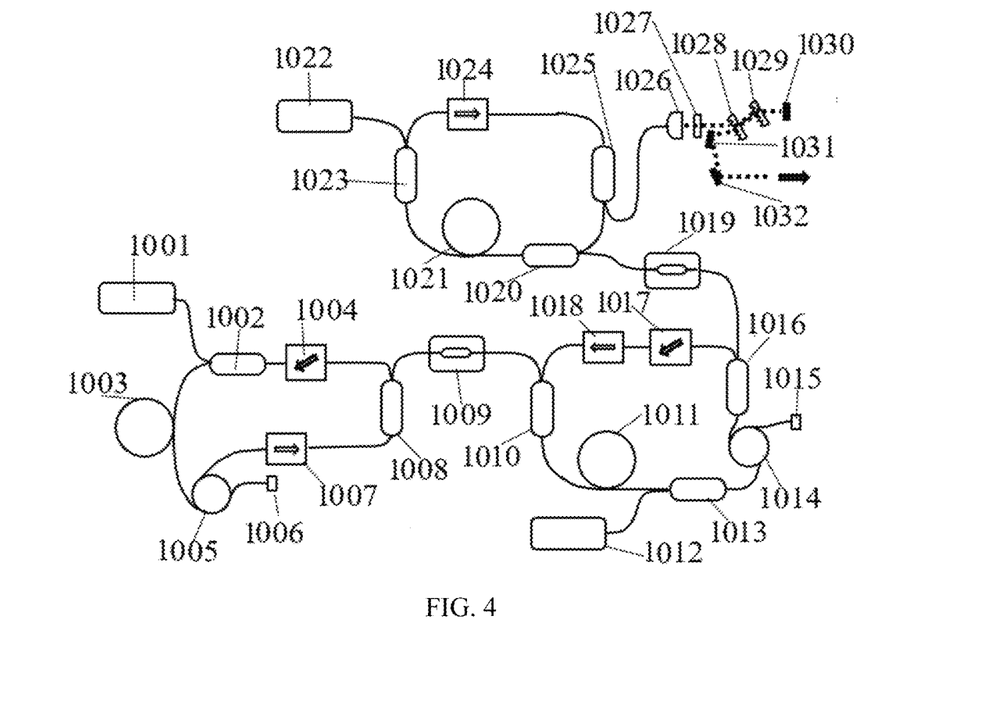
FIG. 4 is a schematic diagram of a system performing the all-fiber pulse cluster laser resonant cavity method according to an embodiment of the present disclosure.

FIG. 3 shows formation of the femtosecond pulse cluster by an all-fiber pulse cluster laser resonant cavity method, and FIG. 4 shows a schematic diagram of a system performing the all-fiber pulse cluster laser resonant cavity method. An optical fiber seed source with a cavity length of $L_s$ outputs a pulse train 13 having a repetition frequency of f and a pulse interval $\tau_s$ ($=1/f$). The optical fiber seed source includes a first semiconductor laser pump 1001, a first optical fiber coupler 1002, a first gain fiber 1003, a first polarization controller 1004, a first optical fiber circulator 1005, a first repetition frequency locking module 1006, a first isolator 1007, a second optical fiber coupler 1008, and a plurality of single-mode optical fibers. The first repetition frequency locking module 1006 is used to lock the repetition frequency of the pulse output of the resonant cavity and change the cavity length $L_s$. The pulse train 13 is output from the second optical fiber coupler 1008 of the seed source, and after the first electro-optic modulator 1009 performs the modulations of frequency lowering and pulse number selecting, a first pulse cluster 14 is obtained. The first pulse cluster 14 has a repetition frequency $f_R$. The first pulse cluster 14 is coupled by a third optical fiber coupler 1010 into an optical fiber regeneration and amplification resonant cavity with a cavity length of $L_a$. The optical fiber regeneration and amplification resonant cavity includes the third optical fiber coupler 1010, a second gain optical fiber 1011, a second semiconductor laser pump 1012, a fourth optical fiber coupler 1013, a second optical fiber circulator 1014, a second repetition frequency locking module 1015, a fifth optical fiber coupler 1016, a second polarization controller 1017, a second isolator 1018. The second repetition frequency locking module 1015 is used to lock and adjust the cavity length $L_a$ of the optical fiber regeneration and amplification resonant cavity. The first pulse cluster 14 after regeneration and amplification is output from the fifth optical fiber coupler 1016. A second electro-optic modulator 1019 is arranged for pulse filtering due to multiple pulse patterns. A falling edge of a working voltage of the first electro-optic modulator 1009 is used as a triggering working voltage of the second electro-optic modulator 1019. Therefore, after being filtered by the second electro-optic modulator 1019, obtained is a second pulse cluster 15 having a repetition frequency $f_R$ and an interval in the time domain, $\tau=|L_s-L_a|/n \cdot c$, where n represents an average refractive index of a fiber core, and c represents a light speed in vacuum. The second pulse cluster 15 is coupled into an optical fiber amplifier through a sixth optical fiber coupler 1020. The optical fiber amplifier includes a third gain optical fiber 1021, a third semiconductor laser pump 1022, a seventh optical fiber coupler 1023, a third isolator 1024, and an eighth optical fiber coupler 1025. The second pulse cluster 15 amplified by the optical fiber amplifier passes through the eighth optical fiber coupler 1025 to a first optical fiber collimator 1026, followed by a pulse width compression module, and enters into the beam splitting and interference system 200. The pulse width compression module includes a first half-wave filter 1027, a first transmission grating 1028, a second transmission grating 1029, a first end reflector 1030, a seventh reflector 1031, and an eighth reflector 1032. After pulse compression, the final output is the femtosecond pulse cluster having a high single pulse energy, a repetition frequency $f_R$ and a time interval $\tau$, presented by $|L_s-L_a|/n \cdot c$, which is used for fabricating the quartz glass microfluidic chip.

Figure 5:
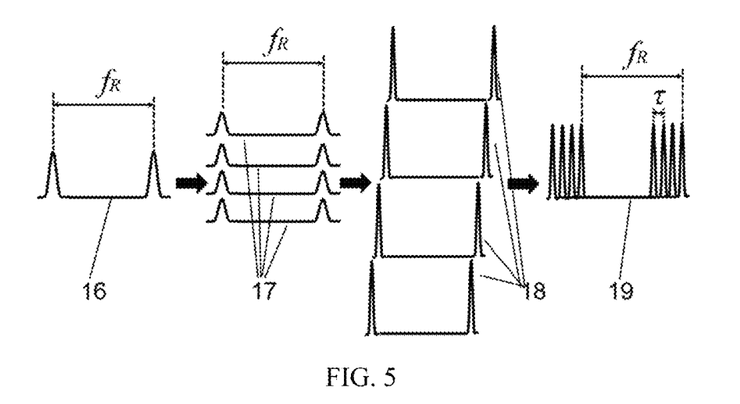
FIG. 5 is a schematic diagram showing formation of a femtosecond pulse cluster by an all-fiber laser cavity output pulse splitting and amplification method according to an embodiment of the present disclosure.
Figure 6:
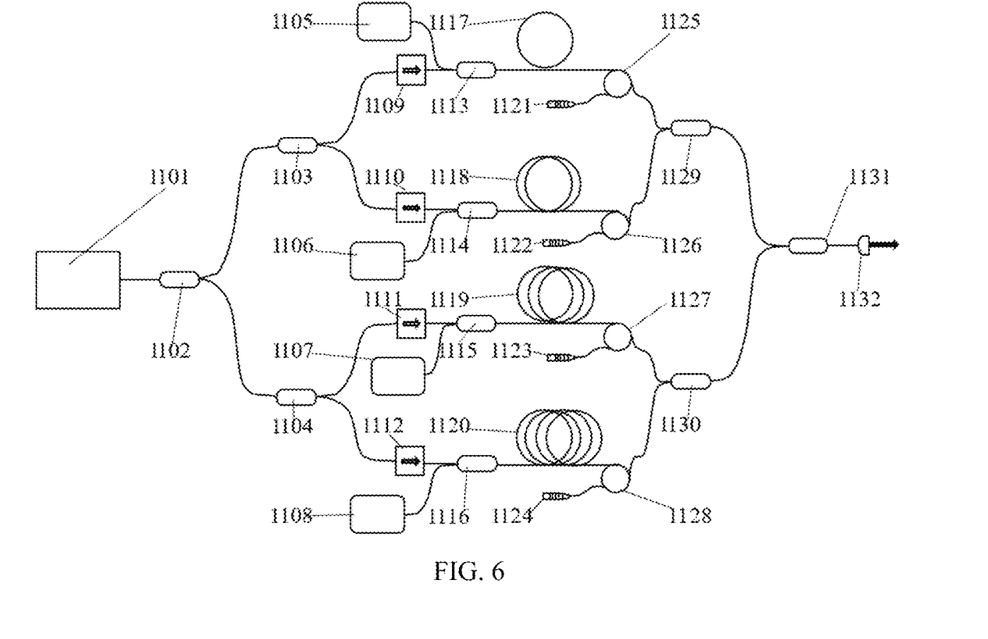
FIG. 6 is a schematic diagram of a system performing the all-fiber laser cavity output pulse splitting and amplification method according to an embodiment of the present disclosure.

FIG. 5 shows formation of the femtosecond pulse cluster by an all-fiber laser cavity output pulse splitting and amplification method, and FIG. 6 shows a schematic diagram of a system performing the all-fiber laser cavity output pulse splitting and amplification method. An ultrashort pulse seed laser 1101 outputs a seed pulse 16 having a repetition frequency $f_R$ (in level of KHz or MHz). The seed pulse 16 is split in two pulses according to a ratio of 50:50 through a first optical fiber splitter 1102, and the two pulses are split according to a ratio of 50:50 through a second optical fiber splitter 1103 and a third optical fiber splitter 1104, respectively, to obtain four split pulses 17 having the same power. A first pulse 17a of the four split pulses 17 passes through a fiber amplification system including a fourth isolator 1109, a fourth semiconductor laser pump 1105, a ninth fiber coupler 1113, and a fourth gain fiber 1117. After amplification, the pulse 17a passes through a fourth circulator 1125 and enters a first fiber chirp compressor 1121 to obtain a new laser pulse 18a with a pulse width in femtosecond or picosecond order. The second pulse 17b of the four split pulses 17 passes through a fiber amplification system including a fifth isolator 1110, a fifth semiconductor laser pump 1106, a tenth fiber coupler 1114, and a fifth gain fiber 1118. After amplification, the second pulse 17b passes through a fifth circulator 1126 and enters a second fiber chirp compressor 1122 to obtain a new laser pulse 18b with a pulse width in femtosecond or picosecond order. The first pulse 18a and the second pulse 18b are coupled together by a first optical fiber combiner 1129. Similarly, a third pulse 17c and a fourth pulse 17d of the four split pulses 17 are amplified and compressed respectively, and are coupled together through a second fiber combiner 1130. A third optical fiber combiner 131 is used to couple the combined pulses from the first optical fiber combiner 1129 and the second optical fiber combiner 1130 to generate a femtosecond pulse cluster 19 with a time interval $\tau$. In the separated fiber amplification systems, a fiber length of a second fiber amplification system is longer than that of a first fiber amplification system, a fiber length of a third fiber amplification system is longer than that of the second amplification system, and a fiber length of a fourth fiber amplification system is longer than that of the third amplification system. That is, the length of the fiber the pulse passes of each fiber amplification systems is gradually increased. In this case, the four pulses are combined with an equal walk-off interval in the time domain to form the pulse cluster. A size of the walk-off in the time domain between the pulses is determined by a difference in propagation optical path of the optical fiber. The pulse cluster 19 combined by the third optical fiber combiner 1131 is converted into a spatial laser beam by a second optical fiber collimator 1132, which is used for fabricating the quartz glass microfluidic chip. An interval $\tau$ between the adjacent pulses in the pulse cluster generated by the all-fiber laser cavity output pulse splitting and amplification method can be adjusted, and a power of each pulse constituting the multiple pulses can be adjusted separately to meet different processing requirements. With the all-fiber structure design, the device is highly integrated. The number of multiple pulses can be determined according to practice. For example, the seed pulse 1101 can be divided into different parts, such as 2 parts, 4 parts, and 8 parts in the same way.

Figure 7:
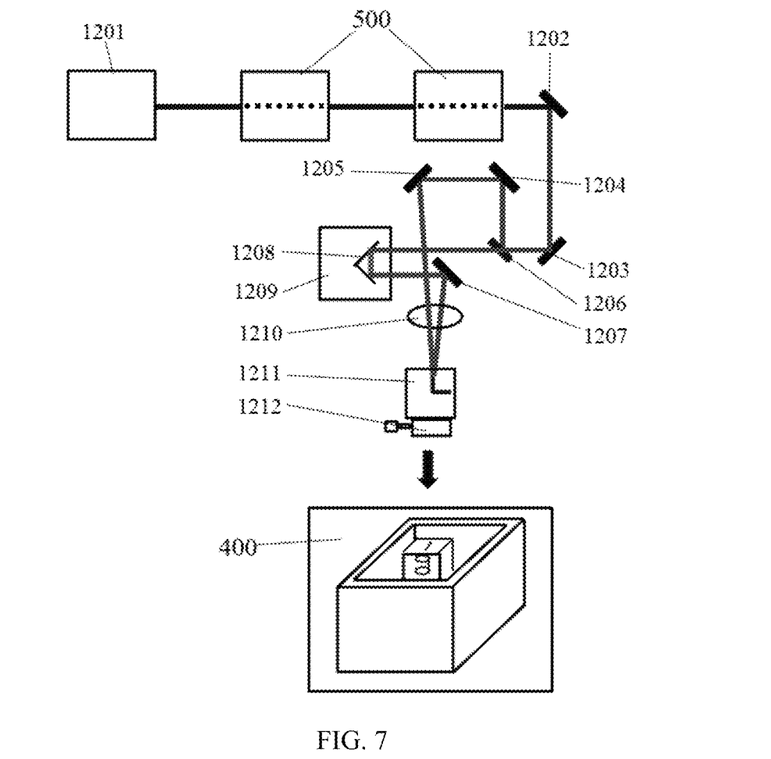
FIG. 7 is a schematic diagram of a system based on splitting and combination optical path control outside a laser according to an embodiment of the present disclosure.

FIG. 7 shows a schematic diagram of a system based on splitting and combination optical path control outside a laser. A femtosecond pulse laser 1201 is a Ti:sapphire laser with a repetition frequency $f_R$ being 1 kHz, a single pulse energy up to 4 mJ, and a center wavelength of 800 nm. Since there is only one light pulse in a period cycle, the external optical path (i.e., outside the laser source) may be arranged to form a femtosecond pulse cluster with a repetition frequency of 1 kHz and an adjustable interval $\tau$. A laser output from the femtosecond pulse laser 1201 passes through a first multi-pulse generating module 500a to form a femtosecond pulse cluster containing two pulses, and passes through a second multi-pulse generating module 500b to form a femtosecond pulse cluster containing four pulses. The first multi-pulse generating module 500a and the second multi-pulse generating module 500b may be the same or different. The multi-pulse generating module may include a half-wave filter, a polarization splitting prism, a right-angle triangular prism or an end reflector and a linear electronic displacement platform, or include a half-wave filter and a birefringent crystal. The femtosecond pulse cluster containing four pulses passes through the ninth and tenth reflectors 1202 and 1203 which are used to change the optical path of the femtosecond pulse cluster, and is divided into two parts (as a transmission pulse cluster and a reflection pulse cluster) according to a ratio of 50:50 by a first beam splitter 1206. The transmission pulse cluster passes through a delay controller including a third recurve reflector 1208 and a third linear electronic displacement platform 1209, and is reflected by a eleventh reflector 1207 to a third circular convergent lens 1210, and then is focused on a second quartz glass 1211, to form the plasma. The reflection pulse cluster generated by the first beam splitter 1206 passes through the eleventh and twelfth reflectors 1204 and 1205 which are used to change the optical path of the reflection pulse cluster, and are focused on the second quartz glass 1211 by the third circular convergent lens 1210. The transmission and reflection pulse clusters coincide at the focal point of the third circular convergent lens 1210 and synchronize in the time domain, and interfere on the second quartz glass 1211 and generate a plasma grating. The second quartz glass 1211 is placed on a second high-precision three-dimensional electronic displacement platform 1212. According to the structure design of the micro-channels, a length of an optical filament and the number of optical filaments of the femtosecond pulse cluster plasma grating, and the pulse interval $\tau_s$ of the pulse cluster can be adjusted. By coordinately controlling the second high-precision three-dimensional electronic displacement platform 1212, the second quartz glass 1211 is ablated to form the microfluidic structure including the micro-channels inside the quartz glass. Further, path(s) or holes are also ablated from the surface of the quartz glass to the quartz glass. The second quartz glass 1211 is immersed in hydrofluoric acid in hydrofluoric acid immersion system 400. A laser-ablated part of the second quartz glass 1211 will be etched by hydrofluoric acid faster than unablated parts. That is, after the second quartz glass 1211 is immersed in the system 400 for a preset period, the microfluidic structure is formed.

Figure 8:
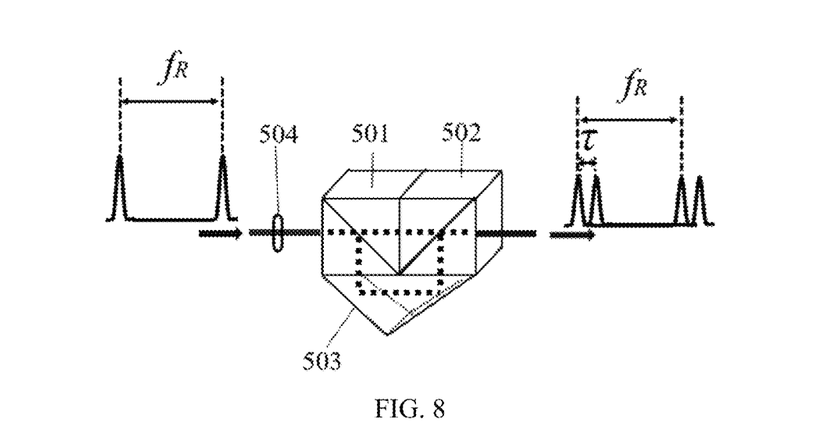
FIG. 8 is a schematic diagram of a multi-pulse generating module according to an embodiment of the present disclosure.

FIG. 8 shows a first example of the multi-pulse generating module 500, i.e., an integrated polarization splitting and combination module 500', which consists of the first and the second polarization beam splitting prisms 501 and 502 (two cubes attached), a right-angle triangular prism 503 with a high reflection film coated on its right-angle side, and a second half-wave filter 504. After the incident laser pulse passes through the second half-wave filter 504 and the first polarization beam splitting prism 501, it is split into a p-polarized transmission light pulse and s-polarized reflection light pulse. The s-polarized reflection light pulse passes through the right-angle triangular prism 503 and is reflected twice, and then overlaps with the transmission light pulse spatially at a medium bonding interface of the second polarization beam splitting prism 502. Since the p-polarized transmission light pulse and the s-polarized reflection light pulse have different propagation paths in the prisms, when the pulses are combined, a pulse cluster formed has the number of pulses which is twice of incident pulses. This integrated splitting and combination module 500' is suitable for a multi-pulse laser light source system for splitting, amplifying, combining and outputting processes.

Figure 9:
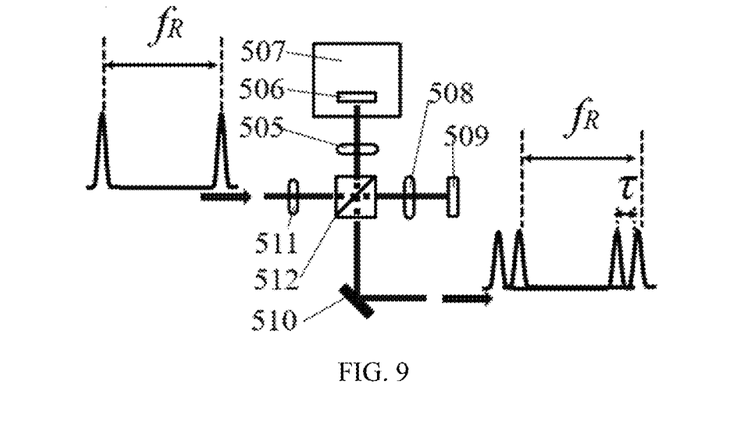
FIG. 9 is a schematic diagram of a multi-pulse generating module according to another embodiment of the present disclosure.

FIG. 9 shows a second example of the multi-pulse generating module 500, i.e., a polarization splitting and combination module 500". After the femtosecond pulse laser beam passes through a third half-wave filter 511 and a third polarization beam splitting prism 512, it is split into two laser beams with similar power. P-polarized light pulse passes through a first quarter-wave filter 508, to form a circularly polarized light, and is reflected back to its original path by a second end reflector 509. After passing through the first quarter-wave filter 508 again, it becomes an s-polarized light pulse. S-polarized laser light reflected by the third polarization beam splitting prism 512 passes through a second quarter-wave filter 505 to become a circularly polarized light, and is reflected back to its original path by a third end reflector 506. After passing through the second quarter-wave filter 505 again, it becomes a p-polarized light pulse, which is spatially combined with the s-polarized light pulse after passing through the third polarization beam splitting prism 512. The third end reflector 506 is placed on a fourth linear electronic displacement platform 507, and is used to adjust a time domain interval τ between two light pulses. In this way, a pulse cluster with an adjustable pulse interval τ can be generated, and the number of the pulses in the pulse cluster is twice the number of incident pulses. The combined femtosecond pulse cluster from the third polarization beam splitting prism 512 passes through a thirteenth reflector 510 which is used to change an optical path of the femtosecond pulse cluster to make its propagation direction to be consistent with the direction of the incident laser.

In addition, terms such as "first" and "second" are used herein for purposes of description and are not intended to indicate or imply relative importance or significance or to imply the number of indicated technical features. Thus, the feature defined with "first" and "second" may include one or more of this feature.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A device for fabricating a quartz microfluidic chip by a femtosecond pulse cluster, including:
    a femtosecond pulse cluster laser source, configured to output a femtosecond pulse cluster;
    a beam splitting and interference system, comprising a beam splitting device, a time domain adjustment controller and a convergent lens, and configured to split the femtosecond pulse cluster into a plurality of parts by the beam splitting device, and to converge split parts by the convergent lens to form a femtosecond pulse cluster plasma grating;
    a sample system comprising an imaging device, a quartz glass, and a three-dimensional electronic displacement platform, wherein the quartz glass is placed on the electronic displacement platform, and the electronic displacement platform is movable to control a position where the parts of the femtosecond pulse cluster are converged on the quartz glass to ablate the quartz glass to form a micro-channel structure inside the quartz glass and/or on a surface of the quartz glass; and
    a hydrofluoric acid immersion system, configured to immerse the quartz glass in a diluent hydrofluoric acid solution to remove an ablated part of the quartz glass to form the quartz microfluidic chip;
    wherein the femtosecond pulse cluster laser source comprises:
        an optical fiber seed source, configured to output a pulse train having a repetition frequency f and a time domain interval $\tau_s=1/f$;

a first electro-optic modulator, configured to perform modulations of frequency lowering and pulse number selecting to obtain a first pulse cluster having a repetition frequency $f_R$;

an optical fiber regeneration and amplification resonant cavity configured to regenerate and amplify the first pulse cluster;

a second electro-optic modulator, configured to shape the regenerated and amplified first pulse cluster to obtain a second pulse cluster having the repetition frequency $f_R$ and a time interval r represented by $|L_s-L_a|(n\cdot c)$, where $L_s$ represents a cavity length of the optical fiber seed source, $L_a$ represents a cavity length of the optical fiber regeneration and amplification resonant cavity, n represents an average refractive index of a fiber core, and c represents a light speed in vacuum;

an optical fiber amplifier, configured to amplify the second pulse cluster; and a pulse width compression module, configured to perform a pulse compression to the amplified second pulse cluster.

2. The device according to claim 1, wherein the beam splitting device is one or more beam splitters, a combination of a half-wave filter and a polarization beam splitting prism, a microarray reflector, or a diffractive beam splitting element.

3. The device according to claim 1, wherein the time domain adjustment controller comprises a linear electronic displacement platform and a reflector and the time domain adjustment controller is configured to change an optical path of the femtosecond pulse cluster.

4. The device according to claim 1, wherein the imaging device comprises a telescope system comprising a first convex lens, a second convex lens, and a CCD camera, wherein the first convex lens is placed in a cross section of the optical axis, and has a focal point coinciding with a focal point of the convergent lens, and the CCD camera is placed at a focal point of the second convex lens.

5. The device according to claim 1, wherein the hydrofluoric acid immersion system comprises an ultrasonic cleaner containing the diluent hydrofluoric acid solution.

6. The device according to claim 1, wherein the femtosecond pulse cluster laser source comprises an optical fiber laser or a solid-state laser, and the femtosecond pulse cluster from the femtosecond pulse cluster laser source is a femtosecond pulse or a picosecond pulse.

7. The device according to claim 1, wherein the optical fiber seed source is a mode-locked fiber laser, comprising a semiconductor laser pump, an optical fiber coupler, a gain fiber, an isolator, a polarization controller and a repetition frequency locking module.

8. The device according to claim 7, wherein the repetition frequency locking module comprises a fiber circulator, a collimator, an end reflector, a phase-locked loop, a signal generator and a linear electronic displacement platform.

9. The device according to claim 1, wherein the fiber regeneration and amplification resonant cavity comprises a semiconductor laser pump, an optical fiber coupler, a gain fiber, an isolator, a polarization controller and a cavity length adjustment module, wherein the cavity length adjustment module comprise an optical fiber circulator, a collimator, an end reflector and a linear electronic displacement platform.

10. The device according to claim 1, wherein the second electro-optic modulator is triggered by a falling edge of a gate voltage of the first electro-optic modulator.

11. The device according to claim 1, wherein the optical fiber amplifier comprises a semiconductor laser pump, an optical fiber coupler, a gain fiber, an isolator, and an optical fiber collimator and a pulse compression module, wherein the pulse compression module comprises a pair of transmission gratings and an end reflector.

* * * * *